(12) United States Patent
Zack et al.

(10) Patent No.: US 6,604,200 B2
(45) Date of Patent: Aug. 5, 2003

(54) SYSTEM AND METHOD FOR MANAGING PROCESSING

(75) Inventors: Rafael Zack, Ramat Gan (IL); Yona Leshets, Zur Igal (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/847,738

(22) Filed: Apr. 22, 1997

(65) Prior Publication Data

US 2002/0124041 A1 Sep. 5, 2002

(51) Int. Cl.⁷ .................................................. G06F 1/26
(52) U.S. Cl. ........................................ 713/320; 709/100
(58) Field of Search ................................ 709/100–108; 713/320, 300–601

(56) References Cited

U.S. PATENT DOCUMENTS 5,142,684 A * 8/1992 Perry et al. .................. 713/320
5,210,872 A * 5/1993 Ferguson et al. ........... 709/102
5,623,647 A * 4/1997 Maitra ......................... 713/501
6,108,426 A * 8/2000 Stortz ........................... 381/77

OTHER PUBLICATIONS

"The Alpha Operating System: Scheduler Evaluation Experiments", Jeffrey Trull et al., Archons Project Technical Report, Feb. 6, 1990.*

"Imprecise Computations", Jane W.S. Liu et al., Proceedings of the IEEE, Vol. 82, No. 1, Jan. 1994, pp. 83–94.

* cited by examiner

Primary Examiner—Zarni Maung
Assistant Examiner—George Lawrence Opie
(74) Attorney, Agent, or Firm—Eitan, Pearl, Latzer & Cohen, Zedek, LLP.

(57) ABSTRACT

A method for managing and controlling a real-time system which is processing a variable complexity task in a predetermined period of time, the method comprising the steps of detecting the progress in processing the task is detected in real-time, determining if the system is likely to complete processing the task in the predetermined time period, increasing or decreasing the complexity of the task and the processing rate of the real-time system accordingly.

15 Claims, 6 Drawing Sheets

SYSTEM AND METHOD FOR MANAGING PROCESSING

FIELD OF THE INVENTION

The present invention relates to a method for managing a real-time system in general and to a method for managing real-time communication processing in particular.

BACKGROUND OF THE INVENTION

Methods for managing and controlling real-time systems are known in the art. A real time system often executes several tasks, at the same time, and it often has to finish executing each of them within a predetermined period of time. Thus, the real-time system has to monitor the progress in execution of each of the tasks and provides resources thereto, accordingly.

If the execution of a task does not progress in a way that the task shall be completed in the given period of time assigned thereto, then the real-time system may increase the number and volume of the resources assigned to this task.

For example, the prediction for a task is that it would require 10 million CPU operations (also called instructions). The time period determined for this task is 2 seconds. The clock of the CPU is set to 50 million instructions/second (MIPS). Thus, the system assigns 5 MIPS to this task, which are 10% of the CPUs' power according to the current clock setting.

While executing the task, after one second has passed, the system detects that this task would require 20 million CPU operations. Hence, there is a single second left to complete the executing of the task, in which 15 million CPU operations have to be performed.

Accordingly, if the rest of the tasks processed by the CPU require less than 35 MIPS, then the system assigns the remaining 15 MIPS to this task.

It will be appreciated that if the system had 15 MIPS available then, the overall efficiency of the system at that time is 70%. Many real-time systems, being aware that they may need extra processing power, reserve a considerable portion of their resources for crisis situations such as described above. Hence, these systems become less efficient.

Another way to provide the task with 15 MIPS is for the system to initially set the clock of the CPU to a higher frequency, In the present example, since the task uses 10% of the processing power of the CPU, the clock of the CPU has to be set to 100 MIPS, which is twice as high as the current setting. By doing so, the system has to operate constantly under a high frequency, which results in a higher power consumption, This aspect is especially critical in systems which have limited power sources such as cellular telephones, pagers and the like. The object of these systems is to reduce power consumption, thereby prolonging the use of their limited power sources.

It will be appreciated that any increase in clock frequency requires an increase of the electrical power which is supplied to the CPU. This aspect is especially critical for apparatus which have limited power sources, such as battery operated devices.

It will also be appreciated that real time systems which run a single task at a time do not have the ability to shift resources between tasks. All of the resources of the system are devoted to the single task and so, a considerable margin has to taken into account when attempting to forecast an outstanding situation which may require more processing resources than normal operation.

A real time system may often encounter low power tasks which require less resources than those available. It will be appreciated that in these cases, the remaining resources, beyond the requirements of a low task, are not used and are, thereby, wasted.

In cellular telephone devices, a considerable reduction of the operating frequency is called sleep mode. In sleep mode, only a selected group of low power tasks may run. Sleep mode is used when the cellular telephone is not in use (i.e. waiting for an incoming call). It will be appreciated that a cellular telephone can not fully operate In sleep mode.

SUMMARY OF THE PRESENT INVENTION

It is an object of the present invention to provide a novel method for providing an efficient management of real-time processing.

According to the present invention there is thus provided a system for real time processing of at least one real-time software application, wherein the processing of at least a selected one of the at least one real-time software application is according to a predetermined complexity level and has to be completed at a predetermined point in time $T_E$.

The system includes at least one processing unit for processing the least one real-time software application, a system clock for timing the at least one processing unit, connected to the processing unit and a processing controller connected to the at least one processing unit and to the system clock.

The processing controller controls the complexity level of the selected software application. The processing controller also detects the extent of progress in processing the selected real-time software application by the at least one processing unit, determines an estimated point in time $T_C$ whereby the processing unit is likely to complete processing the selected real-time software application and provides a command to reduce the complexity level to the processing unit when the estimated point in time $T_C$ is grater than the point in time $T_E$.

The processing controller also controls the frequency produced by the system clock, so as to increase or decrease it.

According to one aspect of the invention, the processing controller includes a memory unit, a real-time clock connected to the memory unit and a processor connected to the memory unit and the real-time clock. The processor receives processing progress indications from the processing unit. The real-time clock detects the frequency produced by the system clock and generates a corresponding time indication for each the processing progress indication. The processor stores each the processing progress indication and the corresponding time indication as a data entry in the memory unit.

The processor determines a prediction of a point in time wherein the processing unit is likely to complete processing the task.

According to another aspect of the invention, there is thus provided a method for managing and controlling the system of the invention, operating according to a predetermined system clock frequency value F. The system processes a real-time task according to a complexity value C and has to complete processing the real-time task by a time point $T_E$. The method including the steps of:

detecting the system clock frequency value F thereby determining a processing rate;

detecting progress in processing the at least one real-time task;

determining a predicted time point $T_1$ from the progress and the processing rate by which the system should complete processing the at least one real-time task;

determining a complexity level decrease value $C_{STEP}$, whereby according to a complexity level of $C-C_{STEP}$, the system is likely to complete processing the at least one real-time task, when the predicted time point $T_1$ is greater than the time point $T_E$;

subtracting the complexity level decrease value $C_{STEP}$ from the complexity level value C and providing the complexity level to the system; and repeating from the step of detecting the system clock frequency value F.

When the complexity value C is limited by a predetermined minimal complexity value $C_{MIN}$, the method including the steps of:

detecting the system clock frequency value F thereby determining a processing rate;

detecting progress in processing the at least one real-time task;

determining an predicted time point $T_1$ from the progress and the processing rate, whereby the system will complete processing the at least one real-time task;

determining a complexity level decrease value $C_{STEP}$, whereby according to a complexity level of $C-C_{STEP}$, the system is likely to complete processing the at least one real-time task, when the predicted time point $T_1$, is greater than the time point $T_E$;

setting the complexity value C to be the minimal complexity value $C_{MIN}$, determining a frequency increase value $F_{STEP}$ wherein the system will complete processing the at least one real-time task by $T_E$ according to a system clock frequency $F+F_{STEP}$ and a complexity level $C_{MIN}$ and setting the system clock frequency value F to be $F+F_{STEP}$, when $C-C_{STEP}<C_{MIN}$;

setting the complexity value C to be $C-C_{STEP}$ when $C-C_{STEP} \geq C_{MIN}$; and repeating from the step of detecting the system clock frequency value F.

According to a further aspect of the invention, the real-time task is operable according to at least two modes of operation. Each of the modes of operation requires a different amount of processing. In this case, the method of the invention the method including the steps of:

determining a selected mode of operation from the at least two modes of operation;

determining a selected system clock frequency value $F_{SELECTED}$ wherein the system will complete processing the at least one real-time task by $T_E$ according to a the selected system clock frequency value $F_{SELECTED}$ and the complexity level C; and setting the system clock frequency value F to be the selected system clock frequency value $F_{SELECTED}$.

The method of the invention, according to this case, may also include the steps of detecting progress in processing the at least one real-time task;

determining an predicted time point $T_1$ from the progress and the processing rate, whereby the system will complete processing the at least one real-time task;

determining a complexity level decrease value $C_{STEP}$, whereby according to a complexity level of $C-C_{STEP}$, the system is likely to complete processing the at least one real-time task, when the predicted time point $T_1$ is greater than the time point $T_E$;

subtracting the complexity level decrease value $C_{STEP}$ from the complexity level value C and providing the complexity level to the system; and repeating from the step of detecting the system clock frequency value F.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The method of the present invention overcomes the disadvantages of the prior art by providing control over the complexity of tasks. In other words, according to the invention, selected tasks are made to be less consuming of system resources.

The present invention provides a processing controller which controls resource allocation and consumption of tasks. If, at real-time, the processing controller detects that the current CPU clock setting will not be sufficient to complete processing the tasks, it can decrease the complexity of selected tasks, thereby reducing their CPU processing power consumption.

According to the invention, the CPU clock setting is maintained and the processing capabilities are utilized at full efficiency.

Figure 1:
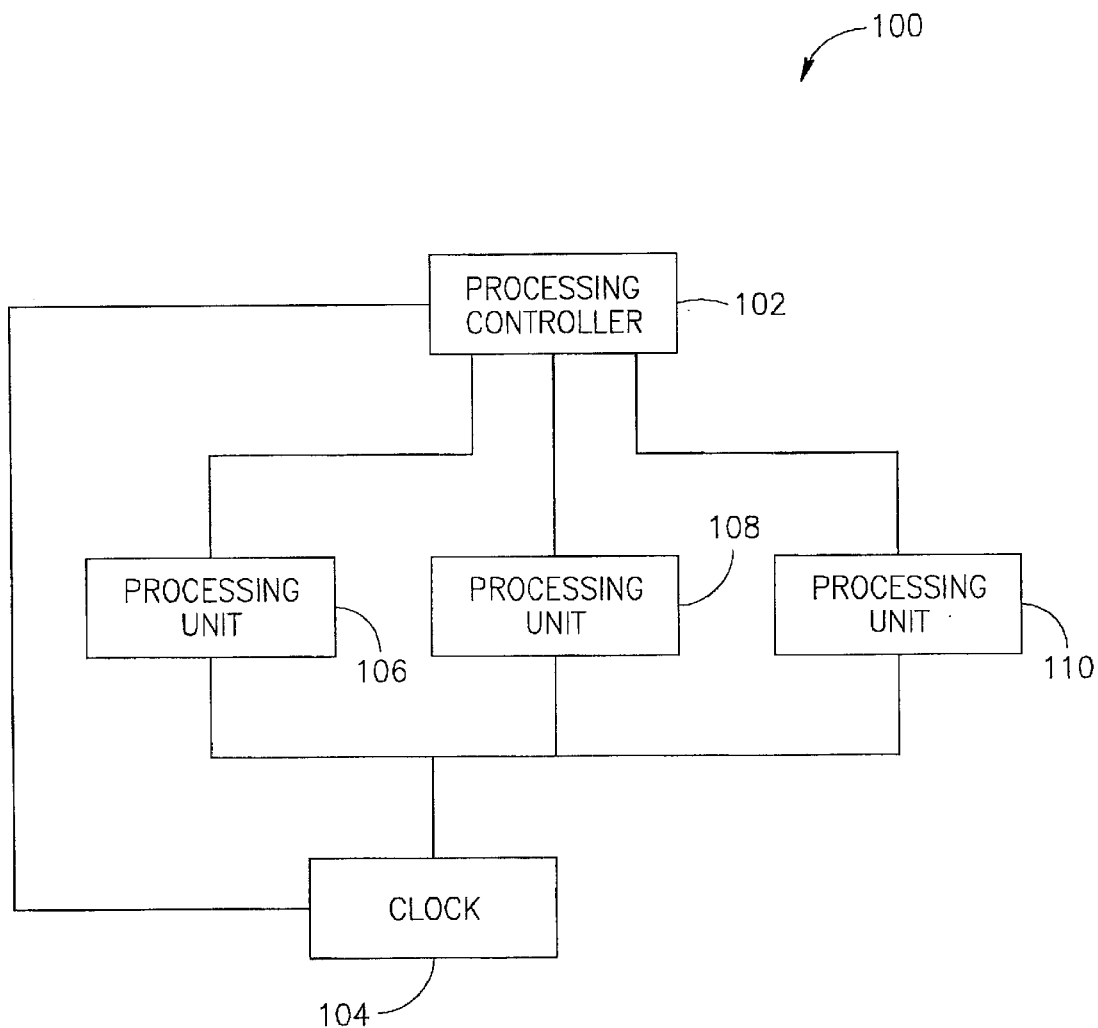
FIG. 1 is a schematic illustration of a system for real-time processing, constructed and operative in accordance with a preferred embodiment of the invention.

Reference is now made to FIG. 1 which is a schematic illustration of a system, generally referenced 100, for real-time processing, constructed and operative in accordance with a preferred embodiment of the invention.

System 100 includes a processing controller 102, a clock 104 connected to the processing controller 102 and three processing units 106, 108 and 110, all connected to the processing controller 102 and to the clock 104.

The clock 104 produces a frequency F which determines the processing rate of the processing units 106, 108 and 110. The clock 104 provides the value of F to the processing controller 102. Each of the processing units 106, 108 and 110 runs a task wherein the processing of each of the tasks has to be completed at a predetermined point In time $T_E$. Each of the processing units 106, 108 and 110 processes its task, according to a predetermined complexity level $C_i$.

The processing controller 102 monitors the progress in each of the processing unit 106, 108 and 110.Each of the processing units 106, 108 and 110 provides processing information to the processing controller 102. This processing information relates to the nature of the currently processed task and to a prediction of the amount of processing needed to complete this task.

It will be noted that, according to one aspect of the invention, the processing unit may provide processing information to the processing controller, upon request from the processing controller. According to another aspect of the invention, the task run by a processing unit may include instructions to provide processing Information to the processing controller, at predetermined points in the algorithm. According to a further aspect of the invention, a processing unit is adapted to provide processing information at predetermined points in the process as well as according to a request of the processing controller. According to yet another aspect of the invention, the processing controller determines a predicted increase value of resource consumption which deviates from a predetermined resource consumption value.

The processing controller 102 determines a predicted time value $T_1$. for each of the tasks processed by processing units 106, 108 and 110, from the processing information and from the processing rate provided by clock 104. In the present example, the processing controller 102 determines predicted time values $T_1$, $T_2$ and $T_3$ for processing units 106, 108 and 110, respectively.

In the present example, the processing controller 102 determines $T_i$ by evaluating each predication of the amount of processing with its time of occurrence.

If $T_1 > T_E$, then the processing controller 102 determines a new complexity value $C_1$, wherein according to this new complexity value $C_1$, the processing unit 106 is expected to complete processing its task no later than $T_E$.

Then, the processing controller provides this new complexity value $C_1$ to processing unit 106, which in turn, reduces the complexity of the task processed thereby.

According to the invention, the processing controller controls both the processing units 106, 108 and 110 as well as the clock 104. The processing controller may provide commands to the clock 104 so as it increase or decrease the frequency.

In the present example, which will be further discussed hereinbelow, the system processes a task which is a series calculation, having N series elements, producing an output Y. The quality of Y increases as N increases since, more elements of the series are calculated. Hence, the quality Q(Y) is proportional to N. It will be noted that a lowest quality $Q_{MIN}(Y)$ can be predetermined, according to various parameters, standards and the like.

Normally, the complexity C of a task determines the quality Q of the output Y. It will be appreciated to those skilled in the art, that Q is proportional to C. According to the invention, a threshold $Q_{MIN}$ is set for the quality which determines the lowest quality of the output Y, which may be tolerated by the system. $Q_{MIN}$ determines a lowest complexity value $C_{MIN}$, which is the lowest level of complexity that will provide an output Y with a quality Q, wherein $Q \geq Q_{MIN}$.

Figure 2:
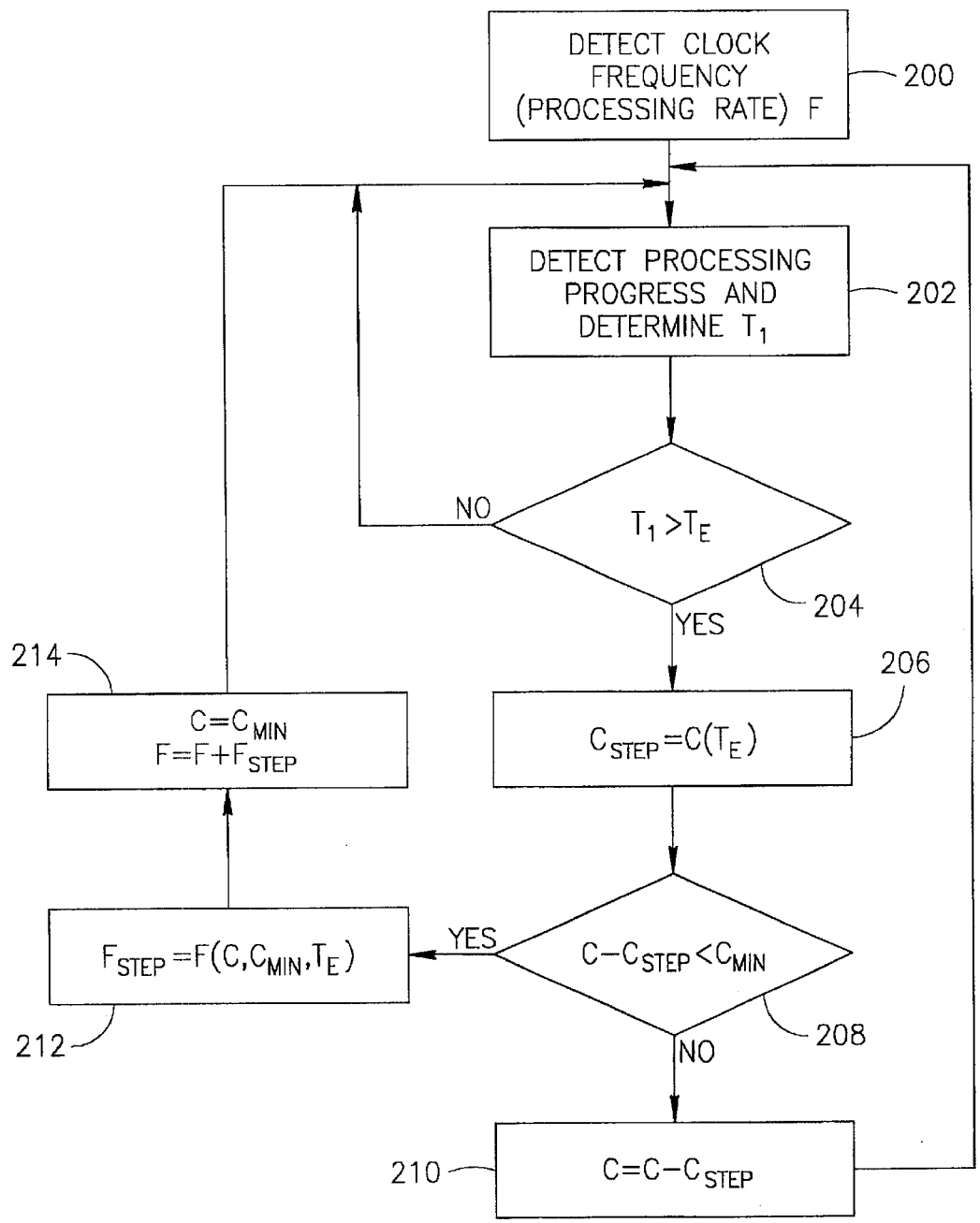
FIG. 2 is a schematic illustration of a method for real-time processing, operative in accordance with another preferred embodiment of the invention.

Reference is now made to FIG. 2 which is a schematic illustration of a method for real-time processing, operative in accordance with another preferred embodiment of the invention.

In step 200, the processing controller 102 detects the clock frequency F, which determines the processing rate of a selected processing units, which in the present example, is processing unit 106.

Then, the processing controller 102 detects the progress in processing of the task at the processing unit 106 (step 202). Accordingly, the processing controller 102 predicts $T_1$ for this task, It will be noted that $T_1$ can also be predicted by processing unit 106 and provided to the processing controller 102.

If $T_1 > T_E$ (step 204), then, according to the current clock frequency F, at the current quality level Q, the processing unit 106 is not likely to complete processing its task in time. Accordingly, the system proceeds to step 206. Otherwise, the system proceeds back to step 202.

In step 206, the processing controller 102 determines the desired decrease in complexity level $C_{STEP}$.

If $C - C_{STEP} < C_{MIN}$ (step 208), then the desired decrease in the complexity will result in a quality which is beneath the $Q_{MIN}$. In this case, the system 100 proceeds to step 212. Otherwise, the system proceeds to step 210.

In step 210, the processing controller 102 provides a complexity decrease command to the processing unit 106, so as to decrease the complexity of its task by $C_{STEP}$. Then, the system proceeds back to step 202.

In step 212, the processing controller determines an increase in the frequency $F_{STEP}$ of clock 104. $F_{STEP}$ is determined according to $C_{MIN}$ and $T_E$, so that $F + F_{STEP}$ is directed to enable processing unit 106 to complete processing the task by $T_E$, according to complexity level $C_{MIN}$.

In step 214, the processing controller 102 provides a complexity decrease command to the processing unit 106, so as to decrease the complexity of its task to a value of $C_{MIN}$. The processing controller 102 also provides a frequency increase command to the clock 104, so as to increase the frequency F by $F_{STEP}$.

According to the present invention, reduction of the complexity level can be provided for tasks which are able to produce variable quality results. Such tasks are, for example, voice encoding and decoding software applications, video encoding and decoding software applications, estimation and prediction procedures, series calculation procedures and the like.

In other words, these tasks are likely to produce variable quality results in a fixed complexity level and have a variable complexity level, given a fixed quality result.

For example, a series calculation procedure is often given by the expression:

$$Y = \sum_{i=1}^{N} A_i X^i$$

wherein Y is an output value, $A_i$ is a coefficient of an element i and N is the number of series elements.

It will be appreciated that conventionally, the quality of Y Increases as N increases, since more elements of the series are calculated. Hence, the quality Q(Y) is proportional to N. It will be noted that a lowest quality $Q_{MIN}(Y)$ can be predetermined, according to various parameters, standards and the like.

According to one aspect of the invention, this series is evaluated so as to determine a minimal number of series elements $N_{MIN}$, wherein $N_{MIN}$ elements have to be calculated in order to achieve an output Y, having the predetermined lowest quality $Q_{MIN}(Y)$. Thus, $N_{MIN}$ determines a minimal complexity level $C_{MIN}$.

In the present example, processing unit 108, processes a task which is a series calculation of N elements. When processing controller 102 detects that processing unit 108 is not likely to complete processing all of the N elements of the series, it can direct the processing unit 108 to process less than N elements, thereby decreasing the complexity of the task.

It will be noted that the method of the invention, as disclosed in FIG. 2, providing a combined control over task complexity C and clock frequency F, is applicable in this case, as in all other examples set forth.

Another example for a variable complexity task is calculating a range of values so as to determine the most suitable one.

Figure 3:
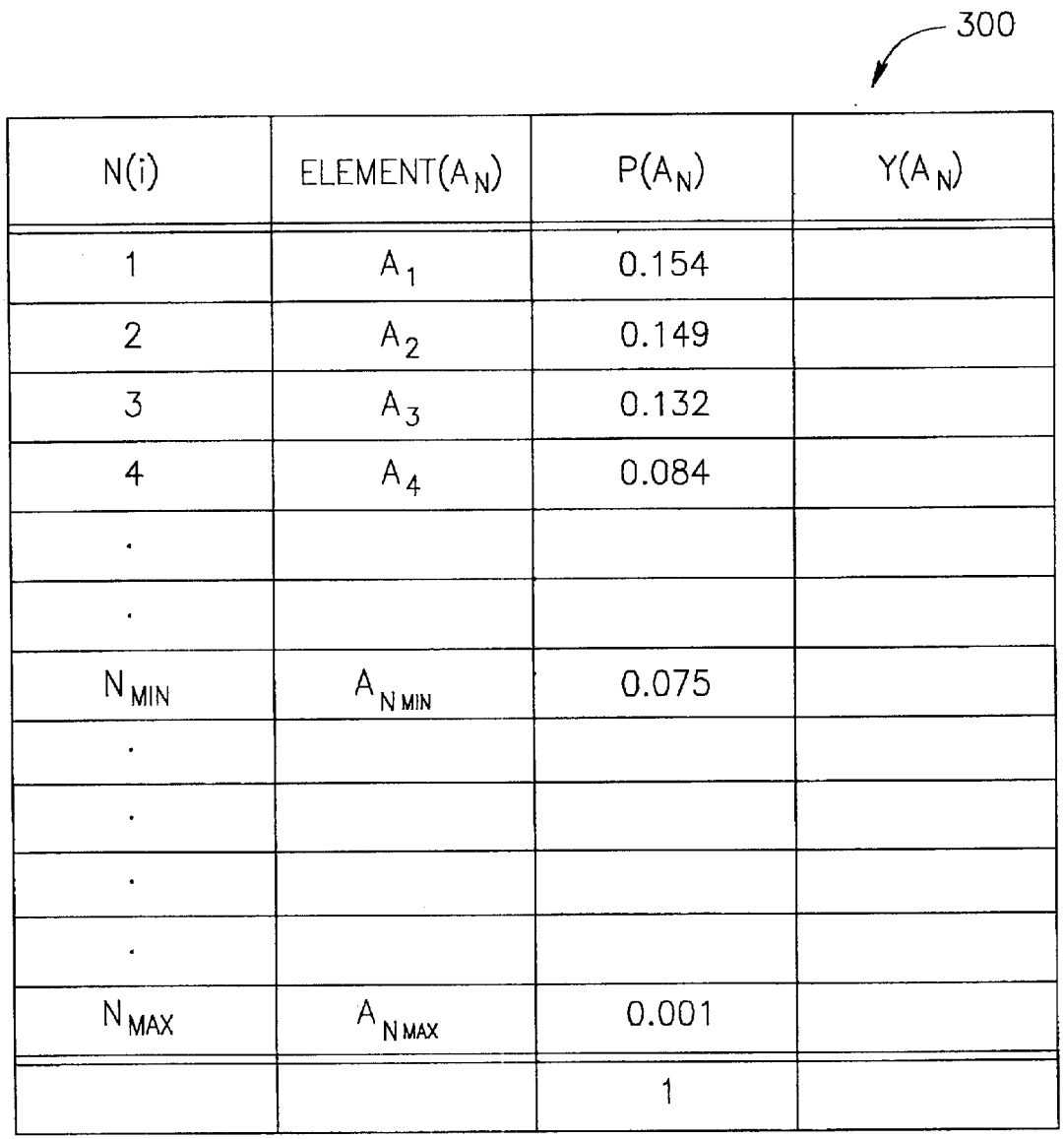
FIG. 3 is a schematic illustration of a range of values provided as input to a processing unit of FIG. 1 so as to determine the most suitable one, in accordance with a further preferred embodiment of the invention.

Reference is also made to FIG. 3 which is a schematic illustration of a range of values provided as input to processing unit 110, so as to determine the most suitable one, in accordance with a further preferred embodiment of the invention.

Range 300 includes a plurality of elements $A_N$, each having a probability P of being the most suitable value for a predetermined parameter. The elements $A_N$ are arranged in a descending probability order, so that the elements having the highest probability are located first and the elements having the lowest probability are located last.

The sum of the probabilities of all of the elements $A_i$ is 1. Hence, an optimal result is achieved when all of the elements $A_N$ are checked.

The optimal object of processing unit 110 is to determine the most suitable value, from the values of elements $A_N$, by checking each and every one of them. Accordingly, if processing unit 110 will check all of the N elements, it will determine the optimal value for the predetermined parameter.

In the present example, N determines the complexity C of the task of determining the optimal value, $N_{MIN}$ is the minimal number of elements which have to be calculated so as to achieve the lowest quality $Q_{MIN}$, tolerated by the system 100.

When the processing controller 102 detects that processing unit 110 is not likely to complete checking $N_{MAX}$ elements, by $T_E$, it can direct processing unit 110 to check less than $N_{MAX}$ elements, as long as it checks no less than the first $N_{MIN}$ elements.

Accordingly, it will be appreciated that at the same time, the processing controller 102 can provide a frequency increase command to the clock 104, if it detects that the complexity decrease of the task run by processing unit 110, will not result in completing the process of this task by $T_E$.

It will be noted that the present invention relates to managing several processing units as well as to managing a multi-tasking single processing unit, whereby a reduction in the complexity of one task provides more system sources which can be provided to another task.

Figure 4:
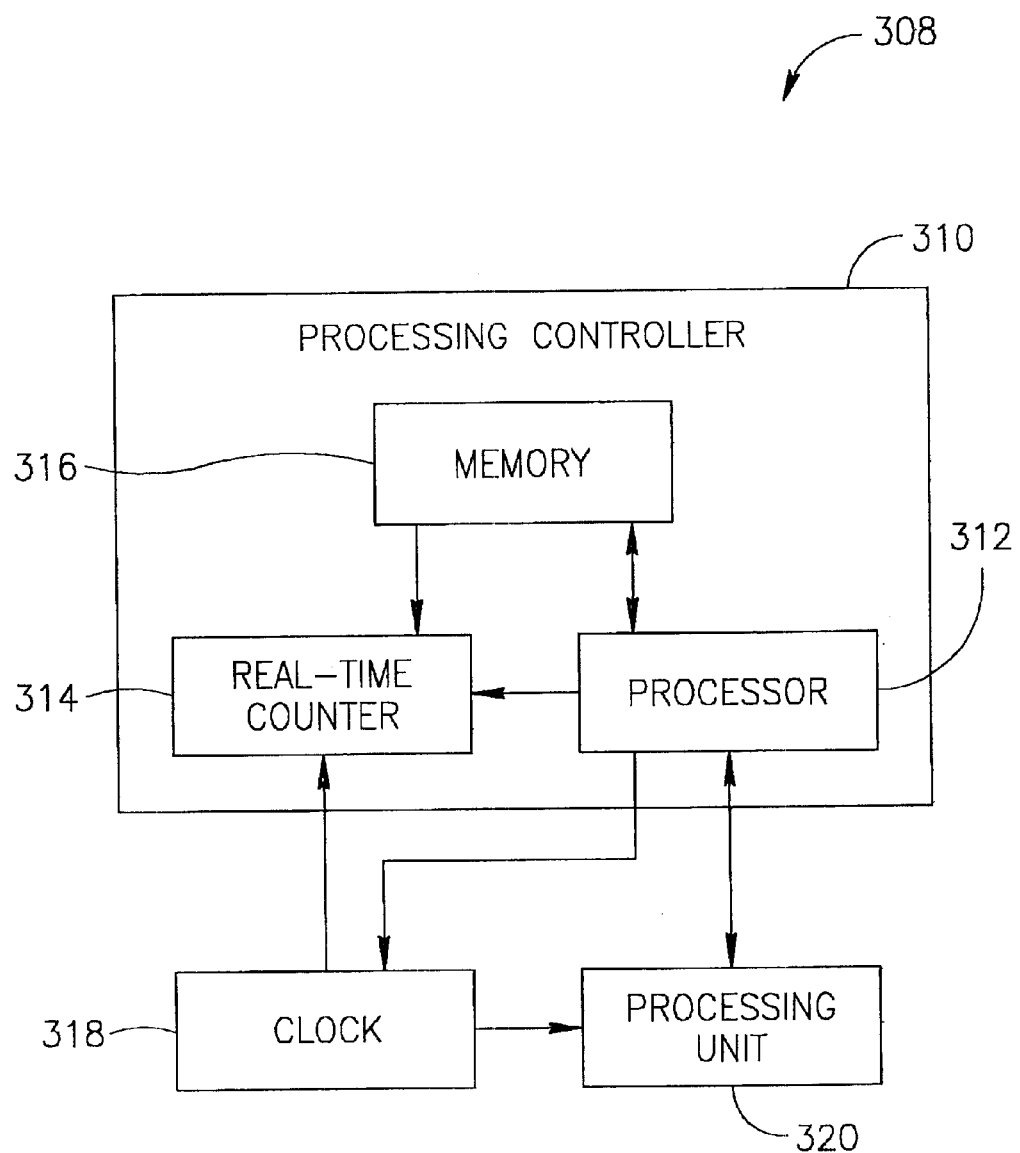
FIG. 4 is a schematic illustration of a system for real-time processing, constructed and operative in accordance with yet another preferred embodiment of the invention.

Reference is now made to FIG. 4 which is a schematic illustration of a system for real-time processing, generally referenced 308, constructed and operative in accordance with yet another preferred embodiment of the invention.

System 308 includes a processing unit 320, a clock 318 connected to the processing unit 320 and a processing controller 310, which is connected both to the clock 318 and to the processing unit 320. The processing controller 310 includes a processor 312, a real time counter 314 and a memory unit 316, which is connected both to the processor 312 and to the real time counter 314.

The clock 318 generates a frequency F signal, which determines the rate of processing and provides it to the processing unit 320. At the same time, the clock 318 also provides this signal to the real-time counter 314. The real-time counter 314 counts time according to the frequency signal provided thereto and can produce a time stamp indication when requested.

The processing unit 320 processes a software application task and provides processing data to the processor 312 of processing controller 310. The processing data relates to the extent of progress that the processing unit 320 has already achieved in processing the task.

The processor 312 stores this processing data in the memory unit 316 as a data entry and at the same time orders the real-time counter 314 to provide a time stamp which is attached to the data entry.

The processor 312 processes all of the data entries of the task run on processing unit 320, stored in the memory unit 316 and calculates a prediction of the time in which the processing unit 320 is likely to complete the processing of the task.

According to the present embodiment, the processing controller 310, including real-time counter 314, is adapted to be connected to system clocks which provide timing signals and do not provide time indications. Thus, the processing controller 310 performs all of the time related calculations required to determine a complexity level decrease or increase. It is noted that the method of the invention, as disclosed in FIG. 2 is also applicable for system 308.

It will be appreciated that for certain types of tasks, one can estimate the amount of processing power required thereby.

Figure 5:
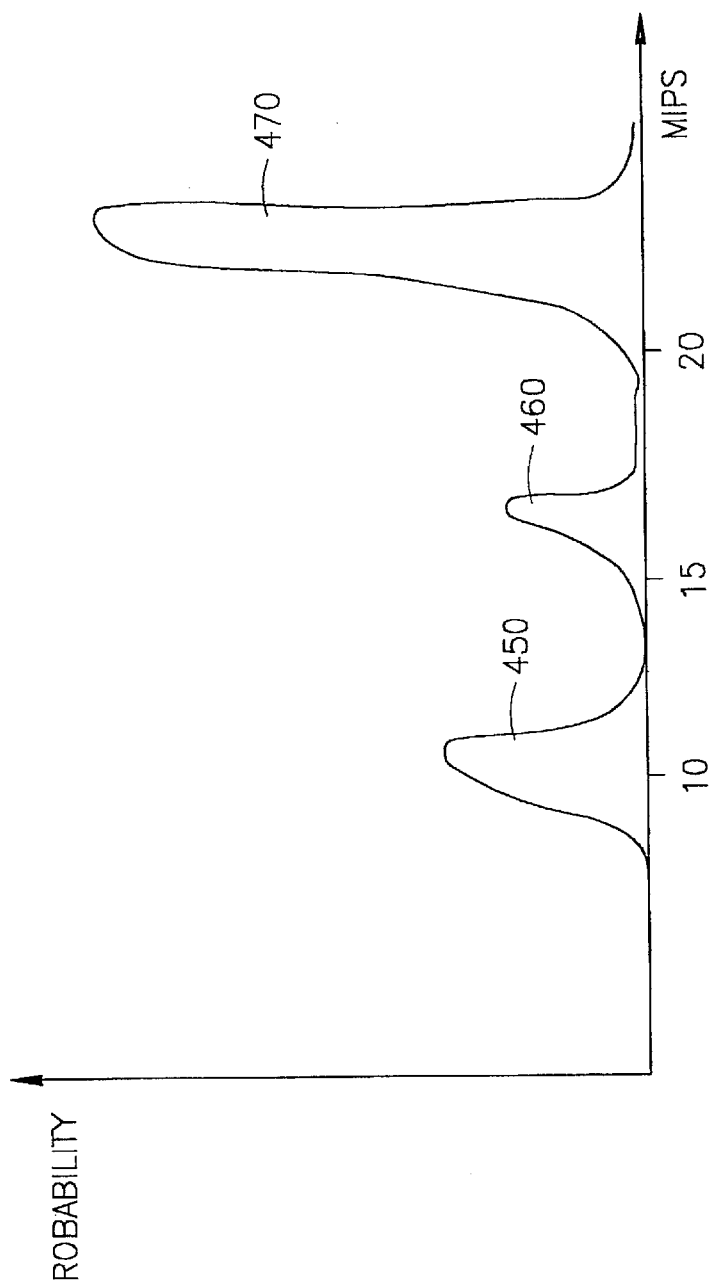
FIG. 5 which is a graphic illustration of probability versus processing power of a typical real-time, variable rate, voice encoding task.

Reference is now made to FIG. 5 which is a graphic illustration of probability versus processing power of a typical realtime, variable rate, voice encoding task.

The horizontal axis represents processing power (in MIPS) and the vertical axis represents the probability of a task to require processing power of a given value.

Area 450 represents all of the tasks which require 10±1 MIPS. Area 460 represents all of the tasks which require 16±0.7 MIPS. Area 470 represents all of the tasks which require 22±1 MIPS.

The real-time voice encoding task of the present example operates according to several known modes of operation, which require different amounts of processing power.

The processing requirements of the first mode of operation are generally located in area 460 (i.e. running the task in the first mode will require between 9 MIPS and 11 MIPS). The processing requirements of the second and third modes of operation are generally located in areas 460 and 470, respectively.

According to the present invention, the system clock can be set to a selected frequency, according to the selected mode. Thus, if the first mode is selected, then the system clock has to be set to 11 MIPS. It will be appreciated that, in systems such as systems 100 (FIG. 1) and 308 (FIG. 4), the system clock can be set to 10 MIPS, whereby the complexity of the task is adjusted accordingly. If the current task requires between 10 MIPS and 11 MIPS, then the system will reduce processing complexity and if the current task requires between 9 MIPS and 10 MIPS, then the system may increase the processing complexity.

It will be noted that the complexity C can be determined from the frequency F and a predetermined time interval in which the task is to be processed beginning at $T_0$ and ending at $T_E$.

When the system is not able to provide an estimation of the exact processing requirements of a given task, it can determine an approximated frequency value and from that, control the complexity of the task, in real-time.

Figure 6:
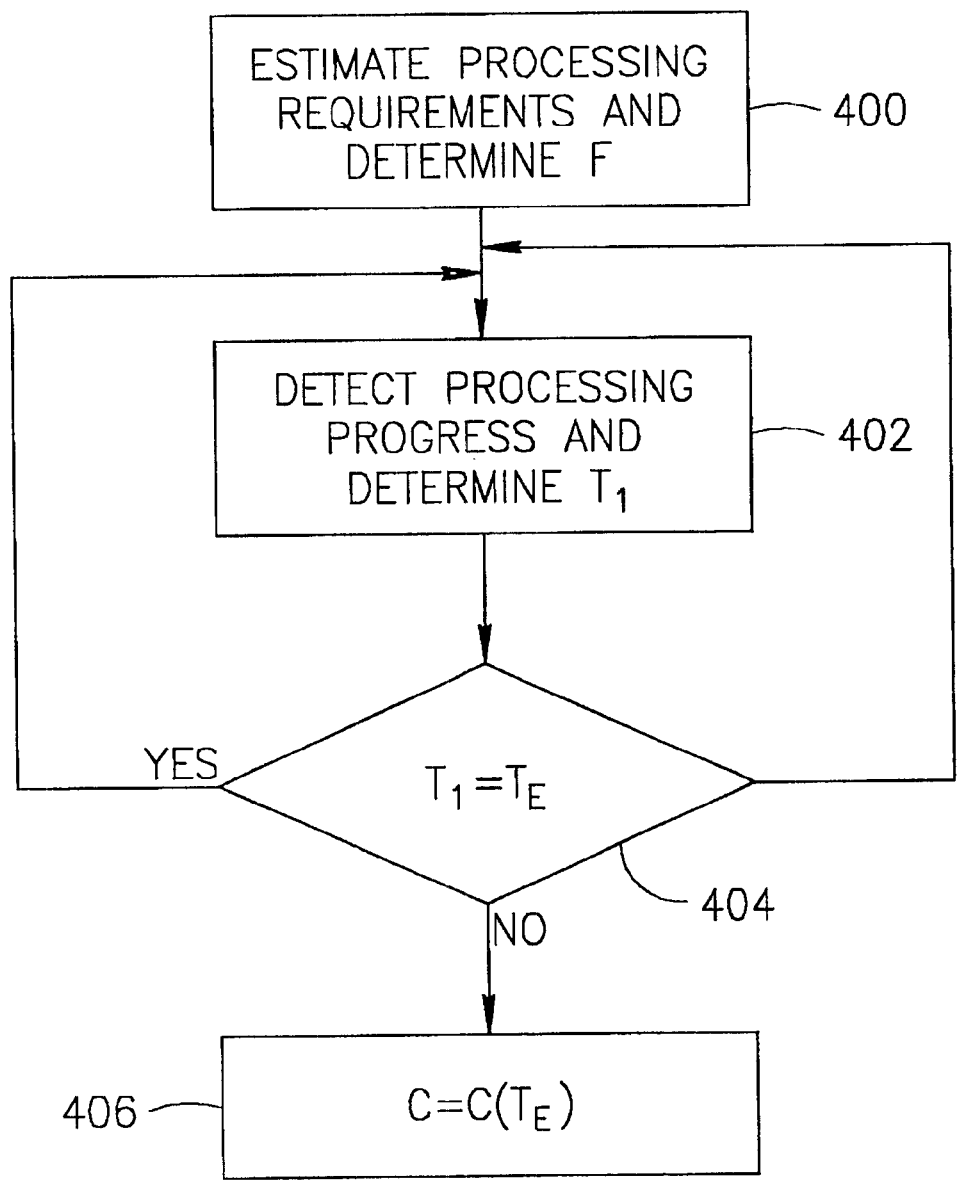
FIG. 6 is a schematic illustration of a method for real-time processing, operative in accordance with another preferred embodiment of the invention.

Reference is also made now to FIG. 6 which is a schematic illustration of a method for real-time processing, operative in accordance with another preferred embodiment of the invention.

In step 400, the system 308 evaluates a task for processing requirements and determines a frequency F which corresponds to these requirements.

In step 402, while processing the task, the system detects the processing progress and determines a predicted point in time $T_1$, in which the system 308 is likely to complete processing the task.

In step 404, if the processing controller 102 detects that $T_1=T_E$, then the system will probably complete processing the task in time and so, the system proceeds back to step 402. Otherwise, the complexity value C has or may be changed according to $T_E$.

In step 406, the system determines the complexity C as the complexity which will use the highest amount of processing power available by the system and still ensure that the system will complete processing the task by $T_E$.

It will be appreciated by persons skilled in the art that the present invention is not limited to what has been particularly shown and described hereinabove. Rather the scope of the present invention is defined only by the claims which follow.

What is claimed is:

1. A system comprising a processing unit adapted to process a software application, a system clock operatively connected to said processing unit and adapted to provide timing to said processing unit, and a processing controller operatively connected to said processing unit and to said system clock, said processing controller adapted to detect an extent of progress in processing of said software application by said processing unit, to determine an estimated time $T_C$ wherein said processing unit is likely to complete processing of said software application, and adapted to change the quality of the output of said software applicatiion.

2. The system according to claim 1, wherein said processing controller is adapted to provide a command to reduce said quality level to said processing unit when said estimated point in time $T_C$ is greater than a predetermined time $T_E$.

3. The system according to claim 1, wherein said processing controller is adapted to control the frequency produced by said system clock.

4. The system according to claim 1, wherein said processing controller comprises a memory unit, a real-time clock connected to said memory unit and a processor connected to said memory unit and said real-time clock;

wherein said processor is adapted to receive processing progress indications from said processing unit;

wherein said real-time clock is adapted to detect the frequency produced by said system clock and to generate a corresponding time indication for each said processing progress indication; and wherein said processor is adapted to store each said processing progress indication and said corresponding time indication as a data entry in said memory unit.

5. The system according to claim 4, wherein said processor is adapted to determine a prediction of a point in time wherein said processing unit is likely to complete processing said task.

6. A method comprising detecting a processing rate, detecting progress in processing of a computing task, determining a predicted time point $T_1$ correlated to the progress and the processing rate by which the processing of the task is likely to be completed, determining a quality of output level decrease value, and reducing a present quality of output value by the quality of output level decrease value.

7. A system comprising:

a processing unit adapted to process a software application, the software application processing a task; and a processing controller adapted to detect an extent of progress in processing of said software application by said processing unit, to determine an estimated time $T_C$ wherein said processing unit is likely to complete processing of said software application, and to change the total amount of data to be processed by the application during the execution of the entirety of the task.

8. The system of claim 7, wherein the task has an output and wherein the processing controller is adapted to lower the quality of the output by reducing the quantity of data items processed by the task.

9. The system according to claim 7, wherein said processing controller is adapted to provide a command to reduce said total amount of data to be processed to said processing unit when said estimated point in time $T_C$ is greater than a predetermined time $T_E$.

10. The system according to claim 7, wherein said processing controller comprises a memory unit, a real-time clock connected to said memory unit and a processor connected to said memory unit and said real-time clock;

wherein said processor is adapted to receive processing progress indications from said processing unit;

wherein said real-time clock is adapted to detect the frequency produced by said system clock and to generate a corresponding time indication for each said processing progress indication; and wherein said processor is adapted to store each said processing progress indication and said corresponding time indication as a data entry in said memory unit.

11. The system according to claim 7, wherein said processing controller is adapted to control the frequency produced by said system clock.

12. The system according to claim 7, wherein said processor is adapted to determine a prediction of a point in time wherein said processing unit is likely to complete processing said task.

13. A method comprising:

processing a software application, the software application processing a task;

detecting an extent of progress in processing of said software application;

determining an estimated time $T_C$ wherein said processing of said software application is likely to complete; and changing the total amount of data to be processed by the application during the execution of the entirety of the task.

14. The method of claim 13, wherein the task has an output, the method comprising lowering the quality of the output by reducing the quantity of data items processed by the task.

15. The method according to claim 13, comprising:

providing a command to reduce said total amount of data to be processed when said estimated point in time $T_C$ is greater than a predetermined time $T_E$.

* * * * *